US012426576B2

(12) United States Patent
Cui et al.

(10) Patent No.: US 12,426,576 B2
(45) Date of Patent: Sep. 30, 2025

(54) METHOD FOR RESTORING WATERBIRD HABITATS BASED ON ECOLOGICAL LEVERAGE THEORY

(71) Applicant: INSTITUTE OF ECOLOGICAL CONSERVATION AND RESTORATION, CHINESE ACADEMY OF FORESTRY, Beijing (CN)

(72) Inventors: Lijuan Cui, Beijing (CN); Daan Wang, Beijing (CN); Wei Li, Beijing (CN); Manyin Zhang, Beijing (CN); Ziliang Guo, Beijing (CN); Gang Liu, Beijing (CN); Henian Wang, Beijing (CN); Weiwei Liu, Beijing (CN); Xinsheng Zhao, Beijing (CN)

(73) Assignee: INSTITUTE OF ECOLOGICAL CONSERVATION AND RESTORATION, CHINESE ACADEMY OF FORESTRY, Beijing (CN)

( * ) Notice: Subject to any disclaimer, the term of this patent is extended or adjusted under 35 U.S.C. 154(b) by 0 days.

(21) Appl. No.: 18/645,425

(22) Filed: Apr. 25, 2024

(65) Prior Publication Data

US 2025/0017177 A1    Jan. 16, 2025

(30) Foreign Application Priority Data

Jul. 14, 2023   (CN) .......................... 202310866093.5

(51) Int. Cl.
*A01K 31/14*   (2006.01)
*A01G 22/00*   (2018.01)

(52) U.S. Cl.
CPC .............. *A01K 31/14* (2013.01); *A01G 22/00* (2018.02)

(58) Field of Classification Search
CPC ....................................................... A01K 31/14
See application file for complete search history.

(56) References Cited

U.S. PATENT DOCUMENTS 6,880,486 B2 *   4/2005  Sonnek ................. A01K 31/14
                                                                   119/435
2007/0215061 A1 *  9/2007  Sia ........................ A01K 45/00
                                                                   119/329

(Continued)

FOREIGN PATENT DOCUMENTS

CN   106277337 A   1/2017
CN   107493952 A   12/2017

(Continued)

*Primary Examiner* — Monica L Perry
*Assistant Examiner* — Brittany A Lowery
(74) *Attorney, Agent, or Firm* — Bayramoglu Law Offices LLC

(57) ABSTRACT

A method for restoring waterbird habitats based on the "ecological leverage" theory is provided. The method includes: Step 1: Determining a target waterbird habitat to be restored based on the ecological environment of a target wetland area; Step 2: Selecting several suitable basic ecological units that are distributed in a scattered, circular, or S-shaped pattern from the target wetland area; Step 3: Optimizing the environment of the selected basic ecological units according to the target waterbird habitat; Step 4: Conducting long-term monitoring of the ecological environment and waterbird population of the optimized ecological units, assessing the restoration of the waterbird habitat, and further optimizing the ecological units based on the assessment results. The method of the present invention achieves an enhancement in waterbird diversity within a region with the minimum ecological space and waterbird habitat restoration efforts.

7 Claims, 4 Drawing Sheets

(56) References Cited

U.S. PATENT DOCUMENTS

| | | | |
|---|---|---|---|
| 2020/0063388 A1* | 2/2020 | Rodriguez Larreta | C02F 3/327 |
| 2021/0347660 A1* | 11/2021 | Zhang | C02F 3/327 |
| 2021/0388566 A1* | 12/2021 | Hanscom | E02B 3/00 |
| 2023/0157214 A1* | 5/2023 | Jiang | G06V 10/803 |
| | | | 702/5 |

FOREIGN PATENT DOCUMENTS

| | | |
|---|---|---|
| CN | 111310098 A | 6/2020 |
| CN | 111861831 A | 10/2020 |

\* cited by examiner

METHOD FOR RESTORING WATERBIRD HABITATS BASED ON ECOLOGICAL LEVERAGE THEORY

CROSS REFERENCE TO THE RELATED APPLICATIONS

This application is based upon and claims priority to Chinese Patent Application No. 202310866093.5, filed on Jul. 14, 2023, the entire contents of which are incorporated herein by reference.

TECHNICAL FIELD

The present invention relates to the technical field of waterbird habitat restoration, specifically to a method for restoring waterbird habitats based on "ecological leverage" theory.

BACKGROUND

Wetlands are crucial components of terrestrial ecosystems and serve as important wintering grounds and migratory stopovers for waterbirds. Wetland waterbirds, as essential biological resources, are significant indicators for assessing the quality of wetland habitats. With the accelerated process of urbanization, the quality of wetland habitats has significantly declined. Degradation or destruction of bird habitats has led to a drastic reduction in the living space for wetland waterbirds, severely impacting their migration, survival, and breeding. Restoring waterbird habitats to enhance waterbird diversity is a pressing issue in wetland restoration.

Currently, there are two main methods for waterbird habitat restoration. The first method involves comprehensive construction to restore waterbird habitats within a region through large-scale water depth regulation, hydrological process adjustment, or vegetation restoration. The second method focuses on a specific location, utilizing techniques such as constructing ecological floating islands, reconstructing fish ponds, transforming rice fields, or enhancing salt pans to achieve waterbird habitat restoration. Although the first method can effectively restore waterbird habitats within a region, its widespread application is challenging due to the large-scale construction and substantial financial investment required. The second method yields effective results for restoring waterbird habitats in specific spatial points like a fish pond or a rice field, but it is difficult to achieve the desired effect of increasing waterbird diversity within an entire region through habitat restoration at a single point.

SUMMARY

The technical problem addressed by the present invention is how to achieve an increase in waterbird diversity across an entire region with minimal waterbird habitat restoration efforts.

To address the above technical problem, the present invention proposes an "ecological leverage" theory: by constructing dispersed, small-scale ecological units, creating habitats for target species, optimizing the layout of individual ecological units at the group level, and forming a spatial organization pattern with point-to-area characteristics, the optimized ecological units are established as interconnected, stable, and orderly functional organisms, thus the effect of enhancing species diversity across an entire region with minimal ecological space and habitat restoration efforts are achieved using a "ecological leverage".

Based on the "ecological leverage" theory, the present invention provides a method for restoring a waterbird habitat, comprising:
step 1: determining a target waterbird habitat to be restored based on an ecological environment of a target wetland area;
step 2: selecting a plurality of basic ecological units from the target wetland area, wherein the plurality of basic ecological units are distributed in a scattered, circular, or S-shaped pattern;
step 3: optimizing an environment of selected basic ecological units according to the target waterbird habitat;
step 4: conducting a long-term monitoring of an ecological environment and a waterbird population of optimized basic ecological units, assessing a restoration of the waterbird habitat, and further optimizing the optimized basic ecological units based on an assessment result.

The wetland area mentioned here includes natural or artificial, permanent or temporary marshes, peatlands, or aquatic zones with stagnant or flowing freshwater, brackish, or saline water bodies, including water bodies with a depth not exceeding 6 meters during low tide.

The ecological unit refers to a unit existing in wetland areas, possessing wetland biological and environmental attributes, and having certain wetland structures and functions.

In the above method, the target waterbird habitat can be a habitat for wading birds and/or natatorial birds.

Wading birds are a category of birds adapted to living and nesting in shallow water or on the shores, including species from the orders Ciconiiformes, Gruiformes, and Charadriiformes, such as herons, shorebirds, corncrakes, and cranes. The primary characteristics of wading birds include "three longs"—long beaks, long necks, and long legs. They are adept at wading, not suitable for swimming, and often stand on one leg while resting. Most wading birds get their food from the bottom of water, from the sludge, or from the ground. Wading birds typically nest in trees, grass, rock crevices, or on roofs, constructing nests from twigs and grass; some species have simple nests, often a shallow depression dug without nest materials in the ground near the water, such as sandpipers.

Natatorial birds is a general term for birds that prefer to feed and nest in water, encompassing species from the orders Anseriformes, Podicipediformes, Gaviiformes, Pelecaniformes and Lariformes, such as anseriformes, gulls, grebes and cormorants. Natatorial birds thrive in aquatic habitats, with backward-extended feet, webbed toes, broad or pointed beaks, and are skilled at swimming, diving, and obtaining food in the water. Most are not adept at walking on the land but are swift fliers. Natatorial birds typically nest in or near water.

In the above method, the target waterbird habitat includes wetland environments and wetland biological communities.

In the above method, the wetland environments include a wetland substrate, a wetland topography, and a wetland water environment.

Wetland substrate refers to the stroma bed in wetland ecosystems where plants grow and microorganisms attach. It plays a crucial role in water purification, including filtering, sedimentation, adsorption, and flocculation. Natural wetland substrate is the soil or sediment at the bottom of water. Artificial wetland substrate, also known as filler, typically consists of one or more materials selected from soil, sand, gravel, broken tiles, peat, expanded clay, zeolite, etc.

Wetland topography includes water-connecting terrain, riparian terrain, wetland plant zone terrain, wetland animal habitat terrain, etc. Wetland topography can influence wetland hydrological connectivity, improve and create environments for wetland vegetation and waterbirds, and increase the heterogeneity and stability of wetland habitats.

Wetland water environment refers to the water bodies in wetland ecosystems, including indicators such as water quantity, water quality, and water level. Wetland water environment can affect changes in the wetland environment, thereby influencing the evolution of wetland communities like vegetation and benthic organisms.

In the above method, the wetland biological communities include wetland plant communities, wetland animal communities, and wetland microbial communities.

In the above method, the plurality of basic ecological units selected in step 2, compared to remaining ecological units in the target wetland area, have an ecological environment closer to the target waterbird habitat.

In the above method, optimizing the environment includes improving a wetland substrate, a wetland topography, a wetland water environment, wetland plant communities, wetland animal communities, and/or wetland microbial communities to meet ecological needs of a target waterbird.

In the above method, improving the wetland water environment includes regulating a water quantity, a water quality, and a water level in a wetland ecosystem.

In the above method, improving the wetland plant communities includes increasing or decreasing a type or a quantity of aquatic plants.

Aquatic plants refer to plants that can grow in water, categorized as emergent plants, floating-leaved plants, floating plant, submerged plants and hygrophytes. Emergent plants include lotus, reeds, cattails, water onions, bulrushes, calamus, oriental water plantain, and arrowhead; floating-leaved plants include water lilies, nuphars, *Nymphoides peltatum*, water chestnuts, gorgon fruit, and *Victoria* regia; floating plants include duckweeds, *Spirodela polyrrhiza*, and water hyacinths; submerged plants include *Ottelia cordata, Ottelia acuminata, Enhalus acoroides, Vallisneria natans*, hornwort, *Ottelia alismoides, Myriophyllum spicatum* and black algae; hygrophytes include canna, pickerelweed, *Lythrum salicaria, Polygonum orientale*, aquatic irises and pennisetum. The reconstruction of aquatic plants plays a crucial role in the stable transformation of freshwater ecosystems.

In the above method, optimizing the environment can also include installing artificial nest boxes and/or signages.

Properly installing artificial nest boxes and signage in optimized ecological units not only provides more nesting and breeding places for waterbirds but also facilitates ecological research and monitoring of waterbirds.

The method provided by the present invention, through dispersed, small-scale ecological unit construction, creates target waterbird habitats, optimizes the layout of individual ecological units at the group level, forms a spatial organization pattern with point-to-area characteristics, and establishes the ecological units as interconnected, stable, and orderly functional organisms. This achieves an increase in waterbird diversity across an entire region with minimal ecological space and habitat restoration efforts, using the "ecological leverage" theory.

The method for restoring waterbird habitats provided by the present invention has the following advantages:

(1) Low cost of waterbird habitat restoration: The present invention does not require comprehensive construction within the target wetland area to be restored. Instead, based on the "ecological leverage" theory, it optimizes the layout of some points (ecological units) within the target wetland area. This approach saves space resources and significantly reduces the engineering and financial investment required for waterbird habitat restoration.

(2) Good effectiveness of waterbird habitat restoration: For the target waterbirds, the present invention creates wetland environment and biology coupled ecological units through a comprehensive design of wetland substrate, wetland topography, wetland water environment, wetland plant communities, wetland animal communities, and wetland microbial communities, and achieves excellent waterbird habitat restoration effects at a single point. By selecting basic ecological units that have suitable water levels or tide levels and have a distribution in a parallel line, circular, or S-shaped pattern for environmental restoration in the target area, it achieves a point-to-area effect, improving waterbird diversity across the entire region through habitat restoration at several points.

BRIEF DESCRIPTION OF THE DRAWINGS

FIG. 2A shows the wetland restoration conditions of the target area before the start of the project, while FIG. 2B shows the layout of the project.

FIG. 3A shows a real-life photo before environmental optimization, and FIG. 3B shows a real-life photo after environmental optimization.

DETAILED DESCRIPTION OF THE EMBODIMENTS

Figure 1:
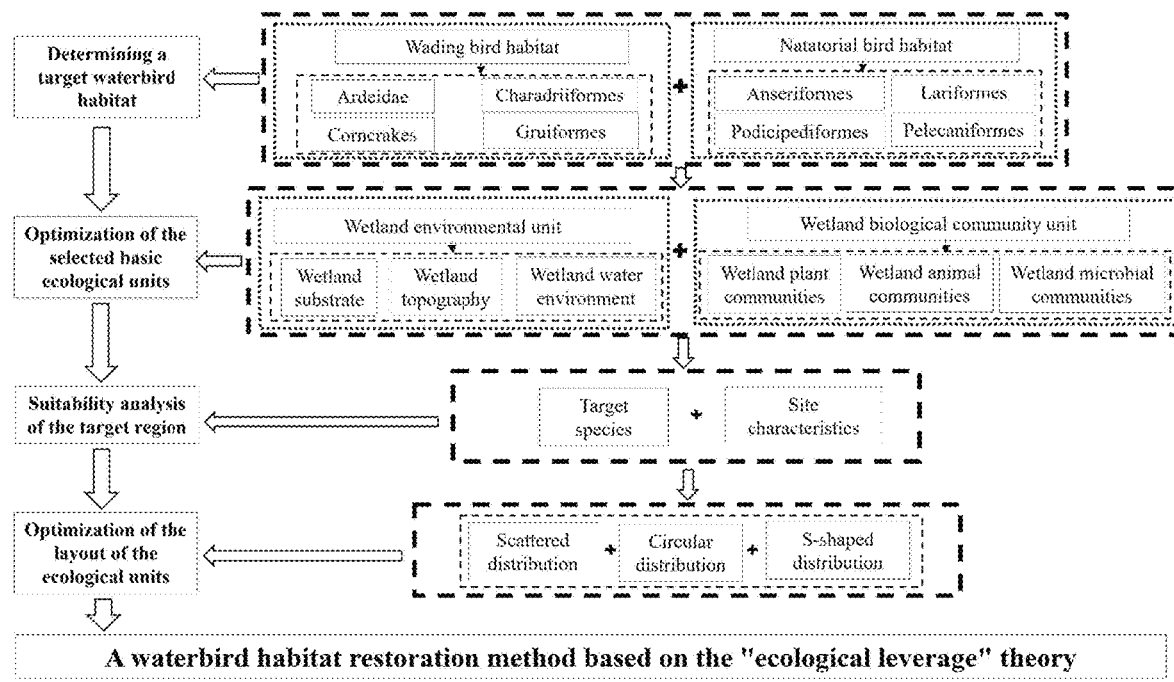
FIG. 1 is a flowchart illustrating the method for restoring waterbird habitats in a typical embodiment of the present invention.

The present invention will be further described in detail below by examples. It should be understood that the examples below are only for the purpose of explaining and illustrating the present invention and should not be regarded as limiting the scope of the invention in any way.

The present invention provides a method for restoring a waterbird habitat, comprising:

step 1: determining a target waterbird habitat to be restored based on an ecological environment of a target wetland area;

step 2: selecting a plurality of basic ecological units from the target wetland area, wherein the plurality of basic ecological units are distributed in a scattered, circular, or S-shaped pattern;

step 3: optimizing the environment of selected basic ecological units according to the target waterbird habitat;

step 4: conducting a long-term monitoring of an ecological environment and a waterbird population of optimized basic ecological units, assessing a restoration of the waterbird habitat, and further optimizing the optimized basic ecological units based on an assessment result.

In some embodiments, the target waterbird habitat is a habitat for wading birds. In other embodiments, the target waterbird habitat is a habitat for natatorial birds. In yet other embodiments, the target waterbird habitat is a habitat for both wading and natatorial birds.

In some embodiments, the target waterbird habitat includes wetland environments and wetland biological communities.

In some embodiments, the wetland environments include a wetland substrate, a wetland topography, and a wetland water environment.

In some embodiments, the wetland substrate is natural wetland substrate. In other embodiments, the wetland substrate is a combination of natural wetland substrate and artificial wetland substrate.

In some embodiments, the wetland biological communities include wetland plant communities, wetland animal communities, and wetland microbial communities.

In some embodiments, the plurality of basic ecological units selected in step 2, compared with remaining ecological units in the target wetland area, have an ecological environment closer to the target waterbird habitat.

In some embodiments, based on the habitat preferences of the target waterbirds, the suitability of the target wetland area is analyzed. Several basic ecological units that are more conducive to restoring the target waterbird habitat and that are distributed in a scattered, circular, or S-shaped pattern are selected from the target wetland area for environmental optimization.

In some embodiments, optimizing the environment includes improving a wetland substrate, a wetland topography, a wetland water environment, wetland plant communities, wetland animal communities, and/or wetland microbial communities to meet ecological needs of a target waterbird.

In some embodiments, improving the wetland water environment includes adjusting a water quantity, a water quality, and a water level in a wetland ecosystem.

In some embodiments, improving the wetland plant communities includes increasing or decreasing a type or a quantity of aquatic plants.

In some embodiments, optimizing the environment also includes installing artificial nest boxes and/or signages.

In some embodiments, the ecological environment of each basic ecological unit is compared with the target waterbird habitat, optimization schemes are formulated, and the environment of each basic ecological unit is optimized.

In some embodiments, the method of the present invention comprises:
  a) Determining optimization goals based on the ecological needs of the target waterbirds, such as optimizing nesting habitats, breeding conditions, etc.;
  b) Understanding the ecological characteristics of basic ecological units, including hydrology, soil, vegetation, and other factors, and analyzing their impact on the target waterbird habitat;
  c) Formulating corresponding optimization schemes based on the optimization goals and the ecological characteristics of the basic ecological units, such as increasing water depth, adjusting water levels, and adding aquatic plants; and conducting scientific, reasonable, and targeted layouts of the ecological units to achieve the targeted restoration of different waterbird habitats;
  d) Continuously checking and adjusting the ecological characteristics of the ecological units during the implementation of optimization schemes to ensure that the waterbird habitat restoration achieves the expected results.

In some embodiments, the method of the present invention comprises:
  Construction of Basic Ecological Units: Selecting suitable basic ecological units in the wetland ecosystem, which comprises aquatic plants, sediments, and water bodies, for appropriate restoration and arrangement;
  Optimization of the Layout of the Ecological Units: Optimizing the layout of the basic ecological units according to the ecological needs and habits of different waterbird species to achieve targeted restoration of different waterbird habitats;
  Water Regulation and Management: Adjusting and managing water bodies according to the ecological needs of waterbirds to ensure that conditions such as water quantity, water quality, and water level in the wetland ecosystem meet the ecological needs of waterbirds;
  Installation of Artificial Nest Boxes and Signage: Installing artificial nest boxes and signage appropriately in the restored waterbird habitat to provide more nesting and breeding sites, and to facilitate ecological research and monitoring of waterbirds;
  Long-term Monitoring and Assessment: Based on the construction of ecological units and water regulation and management, conducting long-term monitoring of the restored waterbird habitat to assess changes in indicators such as ecosystem restoration and waterbird populations, and further optimizing the layout of the ecological units according to the assessment results.

Example 1

A specific implementation case of the present invention is located in the northeast of Zhangziying Town, Daxing District, Beijing, mainly covering villages such as Beixinzhuang, Beisishang, Xiaoheifa, and Sunzhuang, with an area of approximately 7 square kilometers. The project aims to restore the waterbird diversity in this area. The project was started in March 2022 and completed in February 2023.

Specific Implementation Steps (1) Determination of the Target Waterbird Habitat to be Restored Based on the preliminary investigation of the project area, wetland vegetation in the wetland area mainly includes reeds, cattails, lotus, flatstalk bulrush, and duckweed. Waterbirds include Black-winged Stilt, Egret, Pond Heron, Little Grebe, and Gallinules. The wetlands have lush vegetation, a few shallow shoals and open water surfaces, and limited resting and foraging places for waterbirds, with low suitability for waterbird habitats. This project aims to restore habitats for both wading and natatorial birds, optimizing foraging and resting places for different types of waterbirds.

Wading birds have long beaks, necks, and legs, and they prefer foraging in tidal flats and shallow water areas. The vegetation in tidal flat habitats mainly consists of low wetland plants such as sedge grass and bulrush. There are also bare flats without vegetation, often rich in shellfish and snails. Wading birds usually require a certain runway distance for takeoff, hence requiring open space.

Natatorial birds have webbed toes, and generally shorter beaks with flat or pointed shapes. Natatorial birds prefer swimming and diving for food in open water surfaces, requiring habitats with more open and deep water areas, significant elevation differences, fewer shallow areas, and dense emergent aquatic plants. Small fish, submerged plants, and associated snails are the main food sources for Anatidae.

(2) Selection of Basic Ecological Units

Figure 2A:
FIGS. 2A-2B show the layout of an exemplary project implementing the method for restoring waterbird habitats of the present invention.
Figure 2B:

Based on the terrain, hydrology, vegetation, and other requirements of habitats for wading and natatorial birds, it is determined that each ecological unit should comprise shallow shoals, open and deep water areas, areas with emergent and submerged aquatic plants, and buffer zones along the shore to meet the foraging and resting needs of different waterbirds. Four wetlands distributed in a scattered pattern in the northeast of Zhangziying Town were selected as basic ecological units for environmental optimization (FIG. 2B).

(3) Environmental Optimization of Ecological Units

Figure 3A:
FIGS. 3A-3B illustrate the waterbird habitat restoration results of the project shown in FIGS. 2A-2B.
Figure 3B:

According to the requirements of habitats for wading and natatorial birds, environmental optimization was conducted for the selected basic ecological units. Specifically: the shallow shoals were adjusted to have a relatively uniform contour with a slope between 1‰ 0 and 4‰; the depth of the open and deep water areas was adjusted to 1.5 m-2 m; in addition to reeds and cattails, plants such as *Lythrum salicaria*, water lilies and foxtail algae were added to form a distribution area of emergent and submerged aquatic plants, with a coverage of less than 30%; the slope of the existing shore was reduced through micro-terrain modification, with a slope less than 15°, and mulberry were planted as a food source. As shown in FIGS. 3A-3B, before environmental optimization (FIG. 3A), wetlands have lush vegetation, a few shallow shoals and open water surfaces, and limited resting and foraging sites for waterbirds; After environmental optimization (FIG. 3B), there are well-matched wetland plants; there are shallow shoals with suitable size and shape, providing resting and foraging places and runway areas for wading birds; and there are open and deep water areas, providing swimming and foraging places for natatorial birds.

(4) Monitoring of Ecological Environment and Waterbird Numbers

Long-term monitoring of the ecological environment and waterbird numbers in the optimized ecological units was conducted to assess the restoration of waterbird habitats. Based on the assessment results, further environmental optimization of the ecological units was carried out, such as installing multiple artificial nest boxes and signage for waterbird roosting.

Waterbird Habitat Restoration Effect

Before the implementation of the project, there were only 5 species of waterbirds, totaling just over 20 individuals in the area. After the implementation of the project, there are nearly 30 species of birds, totaling over 100 individuals. It can be seen that the method for restoring waterbird habitats of the present invention achieved the "point-to-area" effect through environmental restoration of scattered basic ecological units, and greatly enhanced the waterbird diversity in the entire area.

What is claimed is:

1. A method for restoring a waterbird habitat, comprising:
    step 1: determining a target waterbird habitat to be restored based on an ecological environment of a target wetland area, wherein the target waterbird habitat is a habitat for wading birds and natatorial birds;
    step 2: selecting a plurality of basic ecological units from the target wetland area, wherein each basic ecological unit comprises shallow shoals, open water areas, deep water areas, areas with emergent plants, areas with submerged aquatic plants, and buffer zones along the shore, and wherein the plurality of basic ecological units are distributed in a scattered, circular, or S-shaped pattern;
    step 3: optimizing an environment of selected basic ecological units according to the target waterbird habitat, wherein optimizing the environment comprises improving a wetland topography by adjusting shallow shoals to have a uniform contour with a slope between 1‰ and 4‰, adjusting a depth of open water areas and deep water areas to 1.5 m-2 m and adjusting a slope of an existing shore by micro-terrain modification, wherein the slope of an existing shore is less than 15°;
    step 4: conducting a long-term monitoring of an ecological environment and a waterbird population of optimized basic ecological units, assessing a restoration of the waterbird habitat, and further optimizing the optimized basic ecological units based on an assessment result, wherein the further optimizing the optimized basic ecological units comprises installing artificial nest boxes and/or signages.

2. The method according to claim 1, wherein the target waterbird habitat comprises wetland environments and wetland biological communities.

3. The method according to claim 2, wherein the wetland environments comprise a wetland substrate, a wetland topography, and a wetland water environment.

4. The method according to claim 1, wherein the plurality of basic ecological units selected in step 2 have an ecological environment matching the target waterbird habitat.

5. The method according to claim 1, wherein optimizing the environment further comprises improving a wetland substrate, a wetland water environment, wetland plant communities, wetland animal communities, and/or wetland microbial communities to meet ecological needs of a target waterbird.

6. The method according to claim 5, wherein improving the wetland water environment comprises regulating a water quantity, a water quality, and a water level in a wetland ecosystem.

7. The method according to claim 5, wherein improving the wetland plant communities comprises increasing or decreasing a type or a quantity of aquatic plants.

* * * * *